United States Patent [19]
Kaestner et al.

[11] 3,819,329
[45] June 25, 1974

[54] SPRAY SANITIZING SYSTEM WITH ELECTROLYTIC GENERATOR

[75] Inventors: Erwin A. Kaestner; John Spink, both of Cincinnati, Ohio

[73] Assignee: Morton-Norwich Products, Inc., Chicago, Ill.

[22] Filed: Dec. 6, 1972

[21] Appl. No.: 312,630

Related U.S. Application Data

[63] Continuation-in-part of Ser. No. 142,207, May 11, 1971, abandoned.

[52] U.S. Cl. ............... 21/58, 21/106, 204/128, 204/271, 204/275, 426/235, 426/335
[51] Int. Cl. ...... A23b 1/00, A61l 13/00, B01k 1/00
[58] Field of Search ...... 21/54 R, 58, 106; 204/128, 204/271, 275, 278

[56] References Cited
UNITED STATES PATENTS
1,930,588  10/1933  Dibble .................. 21/106

| | | | |
|---|---|---|---|
| 3,334,035 | 8/1967 | Dews | 21/54 R |
| 3,361,663 | 1/1968 | Murray | 204/275 X |
| 3,378,479 | 4/1968 | Colvin | 204/275 X |
| 3,390,065 | 6/1968 | Cooper | 204/128 X |
| 3,544,442 | 12/1970 | Anderson | 204/271 X |

*Primary Examiner*—Morris O. Wolk
*Assistant Examiner*—Sidney Marantz
*Attorney, Agent, or Firm*—Wood, Herron & Evans

[57] ABSTRACT

A spray sanitizing system for creating a continuous supply of sanitizing liquid is provided with a hand operable wand having a liquid discharge nozzle and a portable central generator unit which includes an electrolytic cell for instantaneously generating a relatively low pH bactericidal solution containing nascent chlorine substantially entirely in the form of hypochlorous acid.

3 Claims, 3 Drawing Figures

PATENTED JUN 25 1974 3,819,329

SHEET 2 OF 2

SPRAY SANITIZING SYSTEM WITH ELECTROLYTIC GENERATOR

This application is a continuation-in-part of the pending application of Erwin A. Kaestner and John Spink, entitled SPRAY SANITIZING SYSTEM WITH ELECTROLYTIC GENERATOR, Ser. No. 142,207, filed May 11, 1971, now abandoned.

The present invention relates to the sanitizing and sterilizing of the surfaces of objects and, more particularly, to a system and method for disinfecting bacteria laden surfaces by spraying the objects with a sanitizing solution.

In food processing plants, bottling plants, dairies and the like, it is a constant requirement that sanitary conditions be maintained. One important sanitizing requirement is the disinfecting of the surfaces of physical objects about the plant by the use of bactericidal sanitizing methods. The systems and methods which must be employed, particularly in food processing installations, must be safe and non-toxic when they are being used, and also must be safe and non-toxic in storage prior to use, and must furthermore leave no unsafe or toxic resins.

Several bactericidal methods have been employed in the prior art. One common method of the prior art is to wash all physical objects including walls and major items of equipment with a bactericidal solution containing bactericidal substances such as quaternary ammonia or chlorine. Chlorine solutions, for example, have been found to be fairly effective in killing bacteria in such cases. However, low pH chlorine solutions which are the most effective bactericides are so highly unstable and have such a limited shelf life that the storage and use of them as effective bactericides has heretofore been highly impractical. High pH solutions, on the other hand, in which chlorine is largely in the form of sodium or calcium hypochlorite, have a somewhat longer shelf life, but are less effective bactericides than the low pH solutions in which the chlorine is largely in the form of hypochlorous acid. To maintain high pH solutions in which the chlorine is in the more stable form, it is necessary that additives such as sodium hydroxide be added to the solution. Such additives, in addition to decreasing the bactericidal effectiveness of the solution, create an additional hazard in that a toxic and irritative solution is formed which leaves a toxic and irritative residue on the surfaces which are washed with the solution and requires that the subsequent washing of these surfaces be undertaken in order to remove this residue. Other additives, for example some used as stabilizers for calcium hypochlorite, form dangerously flammable compounds if not handled or stored properly. Since the most practical way of disinfecting the facilities in the food processing industry has been to wash the facility with the spray of the disinfecting solution, which solution has been purchased in bottle form and stored for at least a short period of time or premixed prior to use from powdered chemicals, these disadvantages have been inherent when such disinfecting methods have been used in the prior art.

It is a primary objective of the present invention to overcome the disadvantages of the prior art by providing a spray disinfecting method and system which utilizes the high bactericidal effectiveness of relatively low pH chlorine solutions while avoiding the problems inherent in storing and preserving the solution prior to use, and while eliminating the toxic irritating and hazardous effects of certain solution additives.

It is a further objective of the invention to provide a method and apparatus for continuously generating a bactericidal solution in which the predominant cidal constituent is hypochlorous acid. To this end the invention contemplates the formation of a brine solution to which an acid, preferably acetic acid, and water are added so that the resultant solution has a pH of approximately 6. That solution, when immediately electrolyzed, results in the production of chlorine in a bactericidal form of which 95–98 percent is hypochlorous acid.

The lowering of the pH of the solution to approximately 6 is extremely important to the efficacy of the subsequently electrolyzed solution. The following table illustrates the dramatic change in the ratio of hypochlorous acid to other and less efficacious chlorine containing constituents:

| pH Value | | % Hypochlorous Acid |
|---|---|---|
| | | % of total free $CL_2$ |
| at | 6.0 | 98 |
| up to | 6.7 | 95 |
| at | 7.0 | 80 |
| at | 8.0 | 21 |
| at | 9.0 | 2.7 |
| at | 10.0 | .3 |

While the lowering of the pH below 6 does not adversely affect the cidal properties of the solution, the solution tends to become quite corrosive and hence less desirable.

Further, it has been determined that low pH nascent chlorine, in the form of hypochlorous acid, is up to three times as effective or has three times the kill rate of nascent chlorine as a hypochlorite.

It has been another objective of the invention to provide a method and apparatus for continuously forming the desired low pH cidal solution, including the supplying of metered amounts of glacial acetic acid to a brine solution and mixing the resultant solution with metered amounts of water to form the solution to be electrolyzed. In the process of the invention, it is contemplated that the amount of acetic acid in relation to the other constituents will have to be varied to account for differing pH of the incoming tap water normally employed in the process.

Further, the present invention provides an industrial system and method for disinfecting the surfaces of objects, particularly in food plants and other areas where high bactericidal effectiveness is required but where toxicity must be completely avoided. The present invention overcomes the problems of the prior art by providing a disinfecting system in which a continuous stream of bactericidal sanitizing liquid is sprayed upon objects to be disinfected, and in which the bactericidal effect of the sanitizing solution is enhanced by generating nascent or instant chlorine in a relatively low pH solution, immediately before the solution is sprayed upon the objects which are to be disinfected. By generating this nascent chlorine in a relatively low pH solution, in its most effective but least stable form, and then spraying it in a continuous washing stream directly upon the surfaces of objects to be disinfected immediately after the solution is generated, and before the solution is able to deteriorate to a less effective level, results in a greatly increased bactericidal effectiveness over the systems and methods of the prior art.

In addition to the high bactericidal effectiveness of the present invention over the prior art, and the advantages provided in the reduced toxicity and irritability to living tissue which the present invention provides, it has been found that the materials required cost only a small fraction of the cost of materials used in common methods of the prior art.

There are several other advantages which the present invention provides, particularly when compared with systems of the prior art in which the high pH hypochlorite solution is maintained by the addition of, for example, caustic lye. Nascent chlorine solutions can be detected by smell only at concentrations that are many times higher than the concentrations of these prior art solutions. The same applies to detection by taste. Furthermore, the stable hypochlorite solutions will irritate the eyes and will bleach certain colors at far lower concentrations than will nascent chlorine.

Furthermore, the nascent chlorine is believed to be far superior to the stable hypochlorite solution in its ability to eliminate odors.

While prior art systems have been devised for utilizing the electrolytic generation of chlorine for disinfecting and sanitizing purposes, the advantages of utilizing nascent electrolytically generated chlorine for a spray solution, in industrially usable quantities, to sanitize the surfaces of objects has not been realized or appreciated. For example, electrolytic chlorine systems have been proposed for disinfecting a fluid or water supply by electrolytically generating chlorine in the solution which is to be disinfected to kill bacteria carried by the fluid. One such application has been in the swimming pool disinfecting area. Another application has been in deodorizing air, an area in which the decomposition and deterioration of the solution in which the chlorine is generated results in a dispersing of the bactericidal chlorine into the atmosphere which is to be disinfected.

The present invention, unlike the systems of the prior art, brings the chlorinated solution, while in its most effective bactericidal form, onto the surfaces of objects to more effectively and completely disinfect the objects than has heretofore been realized, while maintaining greater safety but far lower toxicity and at a lower cost than has been realized in the prior art.

More specifically, it has been an objective of the invention to provide a process for disinfecting meat carcasses by spraying or washing the carcass with the low pH solution of the present invention at a concentration from 25 to about 200 parts per million.

In the meat processing industry, the meat carcass after slaughtering is highly contaminated on its surface with bacteria. That surface contamination has a considerable shelf life shortening effect on the meat, for in the cutting of the meat into its component parts and grinding into ground beef and the like, the surface bacteria is driven from the surface of the meat into interior portions of the meat where it multiplies and results in early spoilage of the meat. Numbers of attempts to solve this problem have been made but have been ineffective. Of the attempts made, perhaps the one which approaches a practical process is that of washing the meat carcass with a commerical high pH hypochlorite of the type described above. This process, however, has been effective in eliminating only 90 percent of the bacteria. The remaining 10 percent, having the capability of migrating or being forced onto interior surfaces of the meat and having the capability of multiplying under conditions of storage, still give rise to demonstrable spoilage. It has been found that by washing the surface of the meat with the solution produced in accordance with the present invention, the bacteria are entirely or substantially entirely eliminated from the surface of the meat; that is to say, the resulting bacteria are too few to count, indicating that the process is at least 99.99 percent effective.

These and other objectives and advantages of the present invention will be more readily apparent from the following detailed description of the drawings illustrating an electrolytic spray sanitizing system and method according to principles of the present invention.

Figure 1:
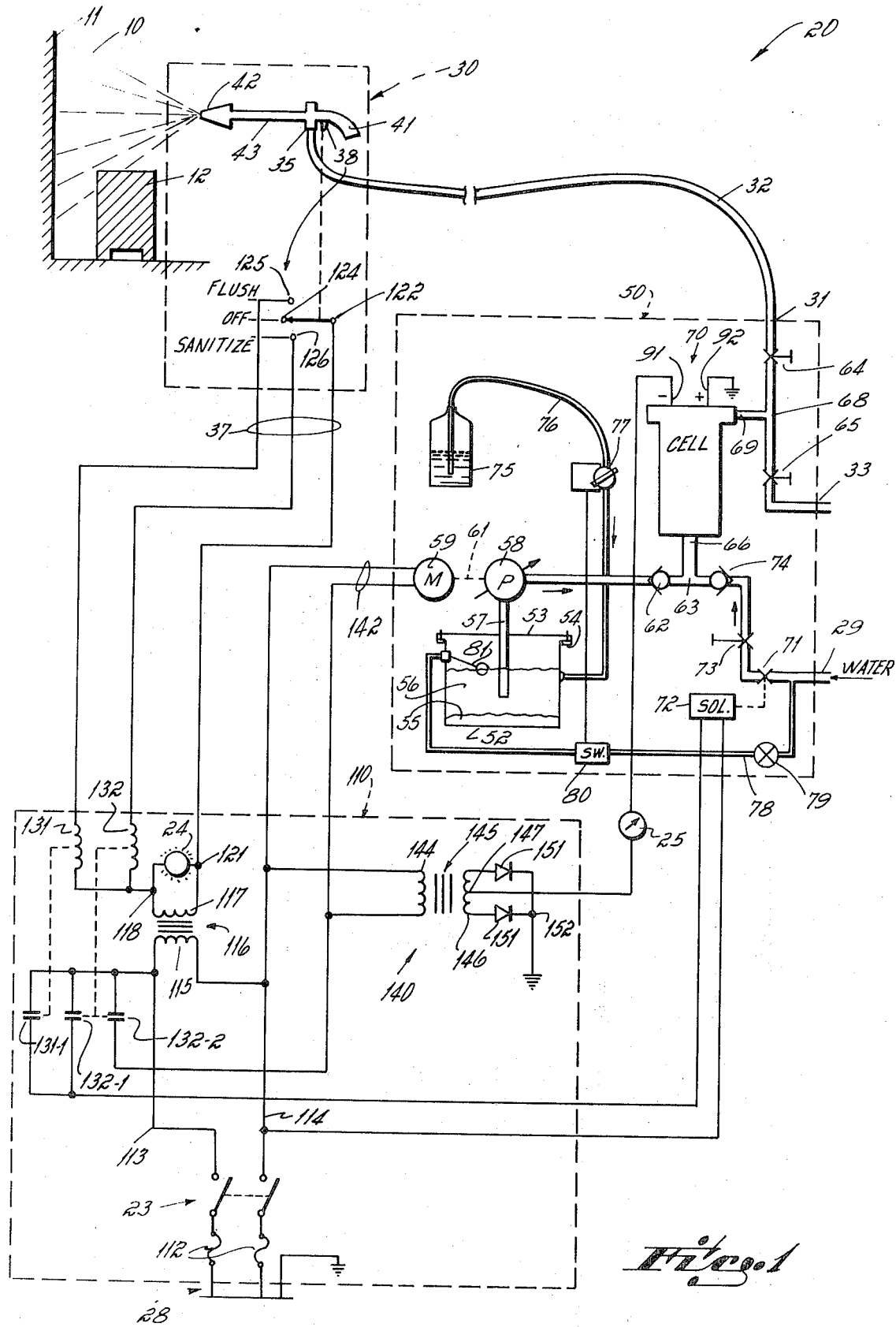
FIG. 1 is a hybrid block, plumbing, and schematic diagram of an electrolytic spray sanitizing system embodying principles of the present invention.

Referring to FIG. 1, one preferred embodiment of a system according to the present invention operates to spray a sanitizing liquid in the form of a continuous spray 10 directly upon the bacteria laden surfaces of objects to be disinfected, such as the walls and floors of the building structure 11 in, for example, food processing plants and the like, or upon the surfaces of other objects 12 such as machinery, furniture, or other equipment in such facilities.

Figure 2:
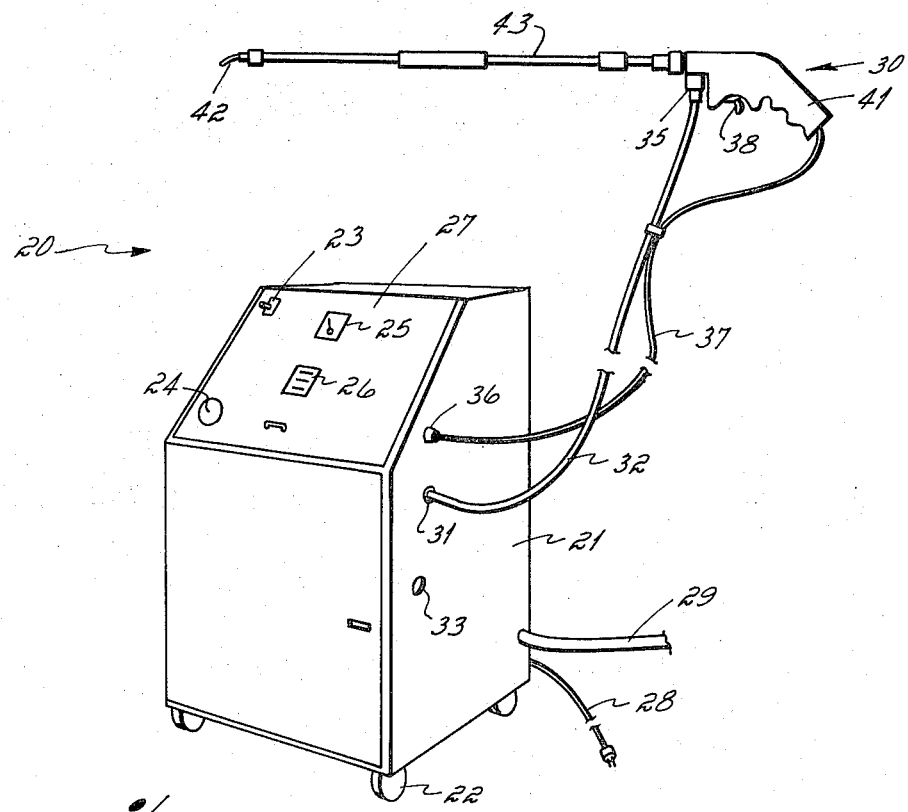
FIG. 2 is a perspective view of a portable unit housing the disinfecting solution generating components, and of the portable wand of the system of FIG. 1.

The sanitizing system includes two independently movable parts which can be better seen by reference to FIG. 2. These parts are the portable sanitizing solution generating unit 20 and the spray wand 30. The unit 20 includes a high grade stainless steel cabinet 21 mounted on casters 22 so that it can be rolled freely about a plant. Mounted on the front of the unit 20 are a power on-off switch 23, a power on indicator light 24, a chlorine solution output meter 25, and an operating instruction plate 26, all arranged on an operator panel 27. The unit 20 also includes a power line cord 28 which is connectable either to a 220 volt AC or a 110 volt AC power line, depending on the internal wiring of the unit 20.

The unit is provided with a fluid inlet port 29 connectable to a conventional tap water outlet of cold water, preferably supplied at a pressure of from 40 to 65 psi. The unit is further provided with two outlet ports for dispensing sanitizing fluids. These ports include a primary outlet port 31 and a bulk port 33. When the system is operating according to principles of the present invention, sanitizing solution will be emitted through the primary outlet port 31 and conducted through a hose 32 to the wand inlet port 35.

The unit 20 is also provided with an electrical connector 36 which connects through a control cable 37 to a trigger toggle switch 38 carried by the wand 30. The switch 38 provides a means for controlling operation of the generator unit 20 from the hand held wand 30 to selectively control the output of spray solution. The switch 38 is a three-position switch having an "OFF" position, a "sanitizing solution ON" position which causes the generation of sanitizing solution and the pumping of the solution to the wand 30, and a "flush ON" position in which unchlorinated water is communicated through the central unit and to the wand to flush the system.

The wand 30 is provided with a pistol grip-type handle 41, a fluid discharge nozzle 42, and a rigid tubular conduit 43 which communicates fluid from the wand inlet port 35 to the nozzle 42.

Referring again to FIG. 1, the internal and operative details of the wand assembly 30 and the central unit 20 are illustrated. The central unit 20 includes two basic sub-systems:
the solution generating or fluid handling sub-system 50, and the electrical control system 110.

The solution generating system 50 includes a brine tank 52 in which a saline solution is prepared. This tank has a removable lid 53 fastened to the tank 52 by bolts 54. The lid 53 is removable so that salt 55 can be deposited in the tank, and so that the tank can be cleaned periodically. A level of water 56 is maintained in the tank 52 and the quantity of salt 55 is maintained at such a level that a saturated saline solution is formed in the water 56. The tank 55 is provided with an outlet pipe 57 which connects to the input of a positive displacement pump 58 which is driven by a motor 59. The pump 58 is a diaphragm type pump having a variable displacement which is controlled by a cam on the drive shaft 61 of the motor 59. The outlet of the pump 58 is connected through a check valve 62 to a "T" 63 which has an outlet connected to the inlet 66 at the bottom of the electrolytic cell 70.

The apparatus includes a system for supplying metered amounts of a food grade acid, preferably 85 percent glacial acetic acid, into the saline solution to lower its pH. If the tap water and hence the saline solution is at a pH of 7, then 2 oz. of acid for each gallon of water are required to achieve the desired pH level.

The acid is contained in a supply 75 connected through a line 76 which includes a pump 77 to the tank 52. Tank 52 is also supplied with fresh make-up water from the inlet port 29 via a line 78 which contains a throttle valve 79 and a flow switch 80. A float valve 81 connected to the line 78 detects the demand for additional solution as, for example, when the solution level drops by 2 gallons and permits water from the port 29 to flow through line 78 to the tank 52. The throttle valve is set to meter the fresh water at 2 gallons per minute.

The flow of water closes switch 80 causing pump 77 to operate to supply acid to the tank. The pump has a variable setting permitting the operator to meter the flow of acid to the tank in accordance with the flow of water and its pH. For example, if the water is at 7 pH, the pump would be set for 4 oz. per minute to result in 2 oz. of acid per gallon of make-up solution.

The clear water inlet 29 of the unit 20 is also connected through a solenoid controlled check valve 71 operated by a solenoid 72 and through a manually controlled needle valve 73 and a check valve 74 to the other input of the "T" 63. At the "T" 62, clear water from the input 29 is mixed with the saline solution from the tank 52 in ratios which are controlled by the combined settings of the cam on the pump motor input shaft 61 and the needle valve 73.

The combined solution enters the cell 70 at the cell input 66 and flows upwardly through the cell where the solution is chlorinated in a conventional manner in which the electrolytic reaction causes chlorine gas to be formed and to combine with the other constituents of the solution to form principally hypochlorous acid (HOCl), certain other compounds such as sodium hypochlorite (NaOCl), and certain active free radicals, along with other byproducts of the reaction. The chlorinated solution, now at a pH of $6 \pm 0.1$, is emitted from the cell 70 at the outlet 69, into a "T" 68. The "T" 68 provides alternative outlets for the solution from the cell through a pair of manually controlled gate valves 64 and 65. The valve 65 controls the emission of bulk solution at the outlet 33 of the unit 20 in the event that it is wanted for use in sanitizing processes other than the spraying of physical objects. The gate valve 64 controls solution to the outlet 31 which connects to the hose 32 to communicate the electrolytically generated chlorinated sanitizing solution to the wand 30. This solution, when flowing, enters the wand 30 at the inlet 35 and is communicated through the tube 43 to the nozzle 42. All fluid fittings of the system are preferably constructed of either polyvinyl chloride or stainless steel to insure high corrosion resistance.

Figure 3:
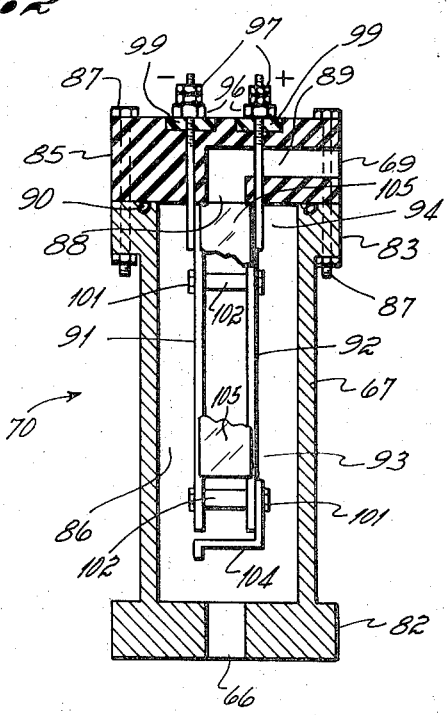
FIG. 3 is a cross-sectional view of an electrolytic cell suitable for use in the system of FIG. 1.

The details of the cell 70 will be better understood by reference to FIG. 3. The cell 70 includes a cylindrical cell body 67 made of non-corrosive metal or other non-corrosive material. The body is provided with an inlet 66 at the bottom end 82 thereof and, at its upper end, is provided with a flange 83. The cell head 85, made of electrically non-conductive material, is secured tightly to the top of the flange 83 by bolts 87 in such a way as to seal the interior 86 of the cell 70. The upper surface of the flange carries an O-ring 90 to effect a seal between the head 85 and the cell body 67. The cell head 85 is provided with an outlet passage 89 which communicates between an interior opening 88 at the center of the cell head 85 at a point between the electrodes and the cell outlet port 69.

The cell 70 is provided with a pair of electrodes including an anode assembly 91 and a cathode assembly 92. The anode 91 is preferably constructed of a noble metal material such as platinum or platinum alloy. This may be constructed either of a solid noble metal alloy or a plated or laminated alloy material. Other materials may also be suitable for some applications such as carbon or lead dioxide. Each type has certain disadvantages; the preferred noble metal anodes, while the most desirable, are the most expensive. Carbon anodes deteriorate rapidly to the point of adversely affecting the efficiency of the cell. Lead dioxide is moderately acceptable but it must be insured that the lead does not contaminate food processing or other like areas. The cathode 92 need not be constructed of a noble metal but should be constructed of a non-corrosive material. Several commerically available titanium and nickel alloys are suitable for this purpose. The electrode assemblies 91 and 92 include the lower immersible portions 93 and upper support portions 94 which extend through the cell head 85. The support portions 94 are adapted to secure the electrodes 91 and 92 to the cell head 85 and are provided with threaded ends by which they may be tightened to the head 85 through the use of the nut and washer assemblies 96. Above the nut and washer assemblies 96 on the electrode support portions 94 are provided other means, such as additional nuts and washers 97, to enable the electrodes to be connected to appropriate wire conductors. A pair of tapered neoprene washers 99 surround the support portions 95 beneath the nut and washer assemblies 96 to form seals between the supports 94 and the head 85.

The electrodes are supported at their lower portions 93 by two pairs of polyvinyl chloride spacers 102 which surround nylon bolts 101. Attached to the lower end of one of the electrodes is a baffle member made of an acrylic plastic 104 which is provided in order to prevent the pulsating saline solution which enters the chamber from port 66 from spurting between the electrodes 91 and 92 and cyclically varying the electrical properties of the condensing solution. Such spurting causes a pulsating current flow through the cell and renders the cell operation difficult to monitor and regulate. By providing the baffle 104, a more uniform and homogeneous solution is maintained within the cell activity 86. This also causes a more uniform electrolyzing current to flow between the electrodes by reducing the pulsating change with time of the properties of the solution between the electrodes. To direct the solution along an axial path between the electrodes, a pair of non-conductive plates 105 extend between each of the opposite edges of the electrodes from their tops to approximately ½ inch from their bottom ends. The plates 105 are preferably transparent to facilitate inspection.

Referring again to FIG. 1, the electrical control circuit 110 includes a power supply which connects to the AC line 28 through a pair of fuses 112 and the on/off switch 23 located on the panel 27. The switch 23 is a double-pole single-throw switch which connects either 110 or 220 volt AC power to the unit line voltage lines 113 and 114. The lines 113 and 114 are connected across the primary winding 115 of a step-down transformer 116 which has a 24 volt secondary winding 117. A power "ON" indicator light 24 is connected across the winding 117. One of the terminals 121 of the transformer secondary winding 117 is connected to the wiper contact 122 of the wand trigger switch 38 through the cable 37. The switch 38 is also provided with a normally-opened OFF contact 124 and two contacts 125 and 126, which are connected through relay windings 131 and 132 respectively to the other secondary terminal 118 of the transformer 116.

The relay 131 is actuated when the trigger switch 38 is in the flush position 125. This relay 131 operates relay contact set 131-1 which connects the solenoid winding 72 across the AC lines 113 and 114. Similarly, a contact set 132-1 is connected in parallel across the contacts 131-1 to similarly energize the solenoid 72 when the switch 38 is in the sanitizing position. A second set of contacts 132-2 of the relay 132 operates, when the switch 38 is in the sanitize position, to connect the winding of the motor 59 across the lines 113 and 114. Connected across the motor winding leads 142 is the primary winding 144 of a transformer 145. The transformer 145 is a step-down transformer having an approximately 20 volt output secondary winding 146. The center tap 147 of the secondary 146 is connected through the current meter 25 to the anode 91 of the cell 70, the cathode 92 of the cell 70 being grounded. The opposite ends of the winding 146 are connected to the anodes of a respective one of a pair of diodes 151, each of which has its cathode connected to ground at point 152. The center tap 147 furnishes a rectified full-wave negative output to the anode 91 of the cell 70.

To initially condition the central unit 20, the brine tank 52 is filled with approximately 20 pounds of granulated and non-iodized table salt. Then by connecting inlet port 29 to tap water at a pressure of about 40 to 65 psi, the tank 52 is filled until float valve 81 shuts off the flow. The flow of the tap water causes switch 80 to energize pump 77 which pumps prescribed quantities of acid into tank 52. When this is completed, the valves 73 and 64 are opened to ready the unit for spray operation.

In operation, an operator orients the wand 30 so that the nozzle 42 is directed towards the objects 11 or 12, the surfaces of which are to be disinfected. The operator can initiate the sanitizing procedure by actuating the switch 38 to the sanitize position, thereby actuating the relay 132 and closing the sets of contacts 132-1 and 132-2 to energize the solenoid 72, opening the valves 71, causing clear water to flow into the inlet 66 of the cell 70. Also, the closing of the relay contacts 132-2 energizes the pump motor 59, causing the pump 58 to pump saline solution which mixes with the clear water at the "T" 63 to enter the inlet 66 of the cell 70. Simultaneously, the rectifier 140 is energized to supply electrolyzing current to the cell 70 to electrolyze the solution flowing through the cell 70, causing a chlorinated disinfecting solution to be emitted from the cell outlet 69 through a "T" 68 and the central unit outlet 31, through the hose 32 and the inlet 35 of the wand 30 and then through the tube 43 of the wand 30 and out of the nozzle 42 in the form of a continuous liquid stream upon the objects 11 and 12.

The salinity of the solution, and thus the chlorine strength of the generated solution, is controlled by coordinating the settings of the cam on the pump motor shaft 61 to control the displacement of the pump 58 with the setting of the valve 73 in the clear water input line. For example, if the ratio of the incoming fresh water to the brine solution is maintained at about 72:1, a 6 inch electrolytic cell will generate 100 parts per million of free chlorine (substantially entirely in the form of hypochorous acid) at ½ gallon per minute flow rate. The 6 inch cell refers to a cell wherein the electrodes are each 6 inches × 2 ¼ inches and operated at 14–17 volts across the electrodes and at a current of 25–30 amps. The solution may be further diluted to reduce the parts per million of chlorine where the particular sanitizing application admits of a lower proportion of chlorine. Further dilution as, for example, up to 100:1 does not adversely affect the pH of the solution, assuming the pH of the incoming fresh water is 7. Where the pH of the incoming water is more alkaline, the pump 77 should be varied to increase the proportion of acid into the solution from 2 ounces per gallon of saline solution.

The invention admits of the production of a cidal solution having a substantially greater chlorine concentration by using larger cells and connecting them in series. For example, the concentration can be increased to 2000 parts per million or even greater should a particular situation require it.

The foregoing description sets forth novel methods and systems wherein far greater bactericidal effectiveness is achieved in a system in which disinfecting by means of spraying or fogging solutions upon solid objects to be disinfected is desired.

As indicated above, the invention has application to the disinfecting of meat carcasses. The solution of the invention, that is, the low pH electrolytically generated chlorinated solution, may be utilized in any one of several different ways. For example, one operator employing a single nozzle might spray a carcass for about 30 seconds at a rate of ½ gallon of solution per minute, the solution having a chlorine concentration from 25 to 200 parts per million. Alternatively, the carcass could be subjected to a multiple nozzle spray as, for example, 12 nozzles spraying for about 10 seconds.

Still another alternative method would involve the prewashing of the carcass with potable tap water followed immediately by creating a dense fog of the solution of the invention surrounding the carcass. In the fogging method, the volume rate of spray is markedly reduced.

What we claim is:

1. A method of disinfecting bacteria laden surfaces comprising the steps of:

electrolytically generating a chorinated solution at approximately 6 to 7 pH and producing a nascent chlorine more than 80 percent is in the form of hypochlorous acid, and immediately thereafter spraying said solution in a liquid stream upon said surfaces, thereby disinfecting said surfaces.

2. A method of sanitizing bacteria laden surfaces according to claim 1 further comprising the steps of:

supplying a saline solution;

supplying acid to said solution to maintain it at approximately 6 to 7 pH, forcing said solution through an electrolytic cell having non-corrosive electrodes which include a noble metal anode and a cathode, and simultaneously applying a DC voltage across said electrodes to chlorinate said solution;

conducting the solution forced from the outlet of said cell to a portable nozzle;

directing said nozzle upon objects to be disinfected;

spraying said conducted solution in a liquid stream from said nozzle and onto the objects to be disinfected;

whereby a chlorinated solution is instantaneously generated at the site of the objects to be disinfected and immediately thereafter is sprayed in a liquid solution form directly upon surfaces to be disinfected, thereby disinfecting the surfaces.

3. A system for disinfecting bacteria laden surfaces comprising:

a portable disinfecting solution generator, said generator including a. a source of saline solution, b. means for supplying metered quantities of an acid to said solution to maintain the solution at a pH of approximately 6 to 7, c. a flow through electrolytic cell having an inlet, an outlet, and a pair of noncorrosive electrodes including a noble metal anode and a cathode, d. means for causing said solution to flow through said cell from said inlet to said outlet and past said electrodes, e. means for controlling the volume of the solution and the concentration of chlorine in the solution, f. means for applying a DC voltage across said electrodes to cause a DC current to flow through said solution to chlorinate said solution while said solution is passing through said cell;

a portable and independently movable wand having an inlet, an outlet, and a passage therethrough connecting said wand inlet and outlet;

means connecting the inlet of said wand to the outlet of said cell;

said nozzle and the operation of said flow causing means being adapted so as to cause said chlorinated solution to be emitted in a continuous liquid stream from said nozzle and onto said surfaces.

* * * * *

UNITED STATES PATENT OFFICE
CERTIFICATE OF CORRECTION

PATENT NO. : 3,819,329
DATED : June 25, 1974
INVENTOR(S) : Erwin A. Kaestner: John Spink It is certified that error appears in the above-identified patent and that said Letters Patent are hereby corrected as shown below:

Col. 6, line 39, "91" should be -- 92 --

Col. 6, line 40, "92" should be -- 91 --

Col. 6, line 40, after anode, "91" should be -- 92 --

Col. 6, line 52, "92" should be -- 91 --

Col. 7, line 1, "95" should be -- 94 --

Col. 7, line 60, "anode" should be -- cathode --

Col. 7, line 61, "cathode" should be -- anode --

Col. 7, line 66, "anode" should be -- cathode --

Signed and Sealed this twenty-third Day of March 1976

[SEAL]

Attest:

RUTH C. MASON
Attesting Officer

C. MARSHALL DANN
Commissioner of Patents and Trademarks